(12) United States Patent
Ward

(10) Patent No.: US 6,549,540 B1
(45) Date of Patent: Apr. 15, 2003

(54) METHOD AND APPARATUS FOR BUNDLING SERIAL DATA TRANSMISSION LINKS TO OBTAIN INCREASED DATA THROUGHPUT

(75) Inventor: Kenneth A. Ward, Shrewsbury, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/268,178

(22) Filed: Mar. 15, 1999

(51) Int. Cl.[7] .................................................. H04J 3/02
(52) U.S. Cl. ....................... 370/412; 370/363; 370/401; 370/474; 370/476; 709/227
(58) Field of Search ................................ 370/362, 363, 370/364, 366, 401, 402, 412, 413, 418, 451, 474, 476; 709/227, 228, 229

(56) References Cited

U.S. PATENT DOCUMENTS

| | | | | |
|---|---|---|---|---|
| 5,220,562 A | * | 6/1993 | Takada et al. ........... | 370/85.13 |
| 6,094,683 A | * | 7/2000 | Drottar et al. ............. | 709/226 |
| 6,157,649 A | * | 12/2000 | Peirce et al. ................ | 370/401 |
| 6,333,929 B1 | * | 12/2001 | Drottar et al. ............. | 370/362 |

* cited by examiner

Primary Examiner—Dang Ton
Assistant Examiner—Shick Hom
(74) Attorney, Agent, or Firm—Kudirka & Jobse, LLP

(57) ABSTRACT

In a switched configuration in which data links can be bundled to increase data throughput, the links in a bundle are ordered. A data sender sequentially transmits cells in the data packet over links in the bundle. For example, a first cell is transmitted over a first ordered link in the bundle. The next cell is transmitted over the next link in the bundle order and operation continues in a "round robin" fashion. The data receiver is informed in advance of the order of links in the bundle and expects cells to be distributed over the links in that order. The data sender transmits a bundle sequence number with each data cell. As each new data cell is transmitted, the bundle sequence number is incremented. The receiver uses the bundle sequence number to validate cell order, to detect lost cells, and to resynchronize cell order with the sender in the case of cell errors. Bundle sequence numbers are used on a single bundle on a single link, or "hop", between a data sender and a data receiver. When the cells are received by the data receiver of a hop, the received bundle sequence numbers are replaced by new bundle sequence numbers generated by the data sender for transmission over the next hop.

30 Claims, 7 Drawing Sheets

METHOD AND APPARATUS FOR BUNDLING SERIAL DATA TRANSMISSION LINKS TO OBTAIN INCREASED DATA THROUGHPUT

FIELD OF THE INVENTION

This invention relates to data transmission over a serial path and methods and apparatus for increasing data throughput over the path.

BACKGROUND OF THE INVENTION

The problem of transferring data from a source to a receiver recurs continuously in data processing systems. For example, such data transfer occurs both over networks on which clients and servers exchange data and over internal computer busses on which CPUs, memories and peripheral units exchange data.

Nodes coupled to a network typically communicate by exchanging messages which comprise discrete packets or "cells" of data. These packets can be transported over the network with one of a variety of transport techniques. For example, asynchronous transfer mode (ATM) is a relatively new data transport technique in which the network transports and switches short, fixed-length cells. In applications utilizing ATM, data packets to be transported are first broken up into ATM cells, transmitted serially over a data link, and then reassembled at a destination. The header of an ATM cell contains the information used to transport the cell from one node to the next over a switched route which has been previously established by means of a separate signaling channel.

Input/output (I/O) subsystems allow CPUs, memories and peripheral units exchange data. In many conventional computer designs, these I/O subsystems use a shared memory mapped model with a shared bus topology. However, there are numerous shortcomings in this technology which limit the computer performance. For example, in a memory mapped bus architecture, the CPU must slow down to the speed of the bus each time communication with one of the controller cards is necessary. In addition, scalability is another prime concern and bus performance does not scale well in shared bus systems. Once all the slots on a bus are occupied, additional peripheral expansion becomes difficult. Further, devices attached to the bus must arbitrate for bus access and contention between devices for bus access can degrade the performance of all devices. System configuration is a difficult because system performance can depend on the exact order of the cards on the bus and the bus must physically be very close to the memory controller. Finally, power and cooling requirements of slot based buses must be designed to handle a fully populated system and thus the cost is increased for systems which are not fully populated.

Consequently, new internal bus technologies are being considered which overcome some of the shortcomings of the shared bus technology. One of these newer bus technologies, called "Next Generation I/O" (NGIO) architecture is a channel oriented, switched point-to-point serial link architecture. The NGIO architecture uses a plurality of "links" or physical connections to connect each I/O controller to a switch. The switch can then connect the I/O controllers to a specialized DMA engine called a "channel adapter" which transfers data between the I/O controllers and the memory. In order to provide extensibility, switches can also be connected to other switches by means of links.

In order to move data packets over a link, specialized hardware breaks each data packet into cells and the cells are transmitted serially from a data source to a data receiver over the link. At the data receiver, the cells are reassembled by other hardware into the complete data packet.

Even though this new architecture is expected to significantly increase data throughput between the memory and I/O controllers, data flow is still limited by the serial data rate of a link and there are instances where the throughput of a single link is insufficient. A similar problem occurs in conventional switched link networks. In the NGIO system, a proposed variation called the Multi Link Extension (MLX) permits several serial links can be dynamically associated into a set called a "bundle" which is used to transmit cells in parallel. The bundle exhibits overall increased bandwidth and can be used to match bandwidths between the I/O controllers and the point-to-point switch. However, no mechanism for implementing bundles has been described. Consequently, there is a need for further increasing the throughput of switched link architectures.

SUMMARY OF THE INVENTION

In accordance with one illustrative embodiment of the invention, the links in a bundle, or set of related links, are ordered. A data sender sequentially transmits cells in the data packet over links in the bundle. For example, a first cell is transmitted over a first ordered link in the bundle. The next cell is transmitted over the next link in the bundle order and operation continues in a "round robin" fashion. The data receiver is informed in advance of the order of links in the bundle and expects cells to be distributed over the links in that order.

In accordance with one embodiment, the data sender transmits a bundle sequence number with each data cell. As each new data cell is transmitted, the bundle sequence number is incremented. The receiver uses the bundle sequence number to validate cell order, to detect lost cells, and to resynchronize cell order with the sender in the case of cell errors.

In accordance with another embodiment, bundle sequence numbers are used on a single bundle on a single link, or "hop", between a data sender and a data receiver. When the cells are received by the data receiver of a hop, the received bundle sequence numbers are replaced by new bundle sequence numbers generated by the data sender for transmission over the next hop.

In accordance with a further embodiment, first in, first out (FIFO) buffers are used at the data receiver in order to compensate for unequal time delays in the links in a bundle.

BRIEF DESCRIPTION OF THE DRAWINGS

The above and further advantages of the invention may be better understood by referring to the following description in conjunction with the accompanying drawings in which.

DETAILED DESCRIPTION

Figure 1:
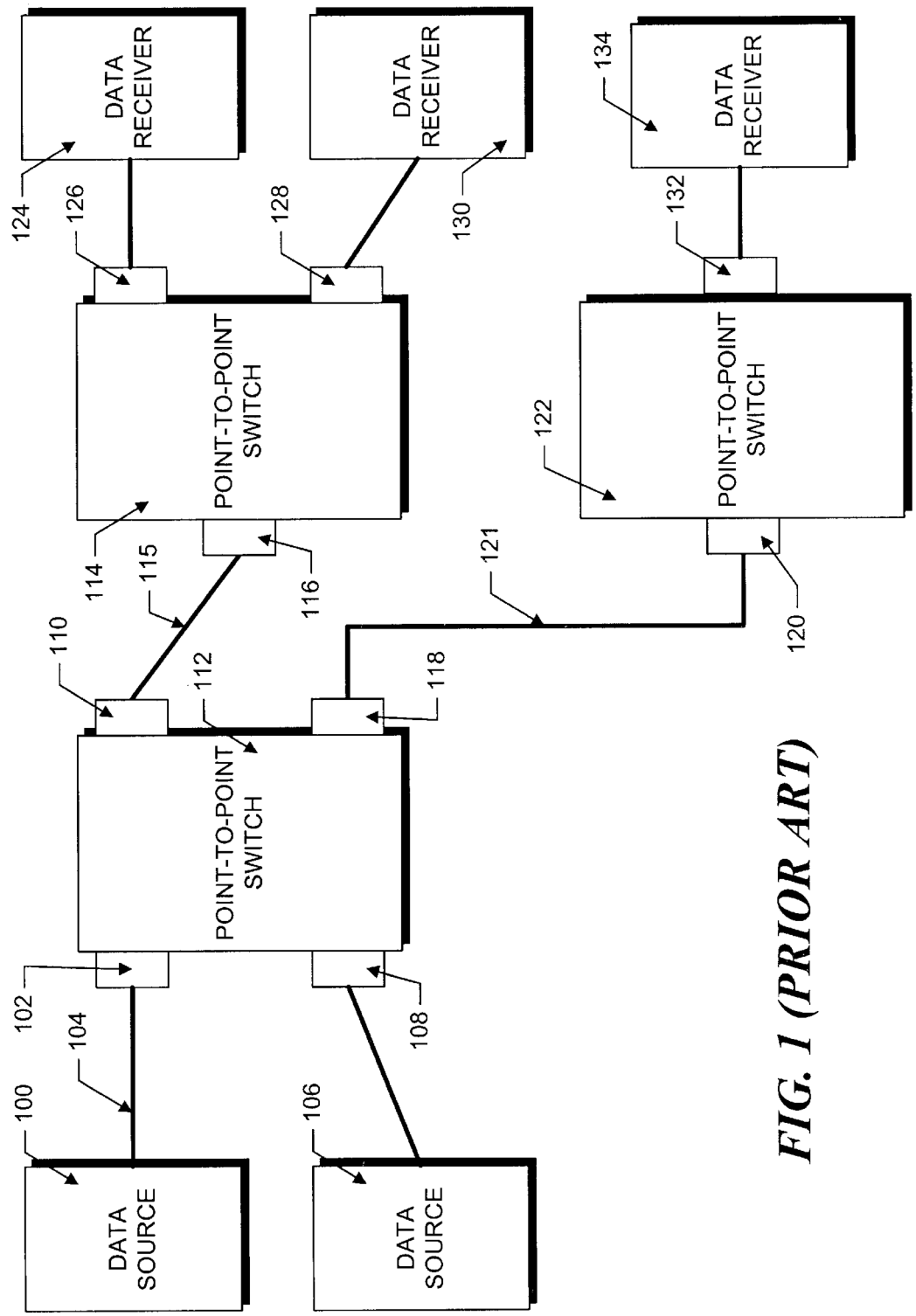
FIG. 1 is a block schematic diagram of a multistage point-to-point switched data configuration.

FIG. 1 illustrates a conventional point-to-point multistage switched data configuration which can use the present invention. In the particular configuration illustrated in FIG. 1, there are three point-to-point switches, 112, 114 and 122. Each of point-to-point switches 112, 114 and 122 is equipped with ports which receive data and which transmit data. For example, switch 112 is equipped with ports 102, 108, 110 and 118. A data source, such as source 100, is connected to input port 102 by means of a data link 104. Similarly, data source 106 is connected to input port 108.

At some point in the data transmission process, generally at the data source 100, a stream of data packets to be transmitted over the switched configuration are broken up into a stream of data cells and these cells are serially transmitted over data link 104 to input port 102. A data cell stream generated by source 106 is transmitted to input port 108. Input ports 102 and 108 can be connected by switch 112 to either or both of output ports 110 and 118.

Switch 112 can, in turn, be connected to switches 114 and 122 by means of further data links. For example, output port 110 on switch 112 can be connected to an input port 116 on switch 114 by means of data link 115. Similarly, output port 118 can be connected to input port 120 of switch 122 by means of data link 121.

In the particular switching configuration shown in FIG. 1 switches 114 and 122 can be connected to a plurality of data receivers 124, 130 and 134. In particular, switch 114 is connected to data receivers 124 and 130 by means of output ports 126 and 128, respectively. In a similar manner, switch 122 is connected to data receiver 134 by means of output port 132. Each data receiver has a mechanism for reassembling the cells transmitted over the switched configuration into data packets which are then transmitted to utilization devices.

The switched configuration illustrated in FIG. 1 is representative of a switched network such as an ATM switching network and is also representative of a multistage switching fabric used in switched bus technology, such as the NGIO technology discussed above. In order to simplify the discussion, the remaining portion of the discussion will focus on the NGIO technology, although it will be clearly understood by those skilled in the art, the principles of the invention are equally applicable to other switched networks as well as switched bus technology.

Figure 2:
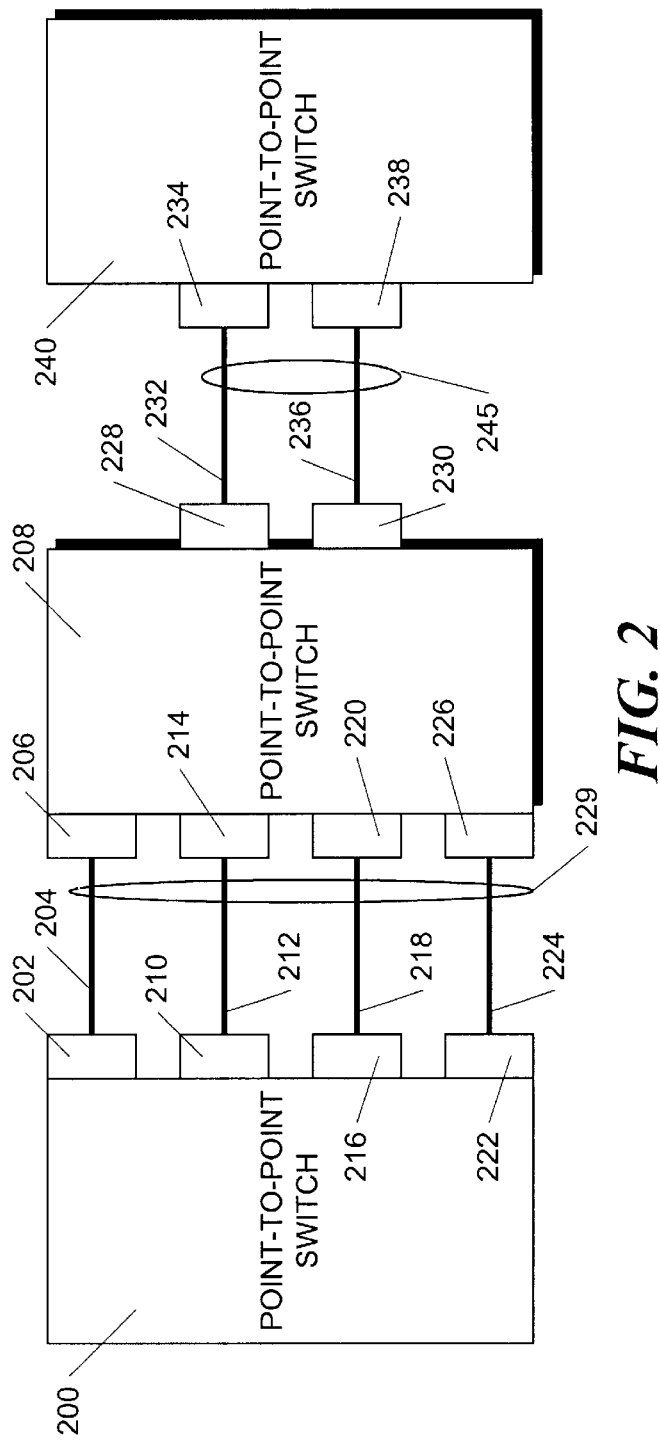
FIG. 2 is a block schematic diagram of two points in the multistage configuration of FIG. 1 illustrating bundling of data transmission links.

In general, the data transfer rate between a data source and a data receiver, for example between data source 100 and switch 112 is limited by the serial data transfer rate of link 104. However, by using an arrangement as illustrated in FIG. 2, called a Multi-link Extension (MLX) configuration in NGIO terms, the effective bandwidth on the data transmission path between a data source and a data receiver can be increased by bundling links together. Data cells which would normally be transmitted sequentially over a single data link are transmitted in parallel over all of the data links in a bundle. The use of bundles allows bandwidth matching between data sources and data receivers, for examples between two switches. In particular, switch 200 is connected to switch 208 by means of four data links. Data link 204 connects output port 202 of switch 200 to input port 206 of switch 208. Similarly, data link 212 connects ports 210 and 214. Data link 218 connects ports 216 and 220 and data link 224 connects ports 222 and 226. Data links 204, 212, 218 and 224 can be associated as a group or "bundle" 229 and data cells which would normally be sent sequentially over a single link can be transmitted in parallel over the four links 204–224 thereby effectively increasing the data transfer rate by a factor of four.

A similar arrangement can be used to increase the bandwidth between switches 208 and 240. In particular, data link 232, which connects ports 228 and 234 and data link 236 which connects ports 230 and 238 can be considered to be a second bundle 245 over which data cells transmitted between switches 208 and 240 can pass in parallel.

In accordance with the principles of the present invention, data cells are reliably transmitted over a bundle by ordering the data links in the bundle in a fixed, predetermined order. Data cells in a stream are then transmitted in the fixed order in a round robin fashion. For example, a data cell in the data cell stream is transmitted over one of the links. The next data cell in the stream is then transmitted over the next ordered link and so on. Alternatively, two cells could be transmitted over a link and the next two cells over the next link, etc. In this manner, the data cells are transmitted in parallel over the links in the bundle. The data receiver is informed of this order so that it can determine at which data link the next data cell in the sequence will arrive.

However, due to varying transmission times over the different links, it is possible for the cells to arrive at the data receiver out of order. Therefore, to further enhance reliability, a sequence number is included with each data cell transmitted over the links in the bundle. This "bundle" sequence number (BSN) is incremented with each cell that is transmitted. At the receiving end, the data cells from each of the links are received in first in, first out (FIFO) buffers. The bundle sequence number at the output side of each of these buffers is examined to determine whether cells have arrived in the proper order. In addition, the bundle sequence number can be used to deal with various error conditions, as described in detail below.

Figure 3:
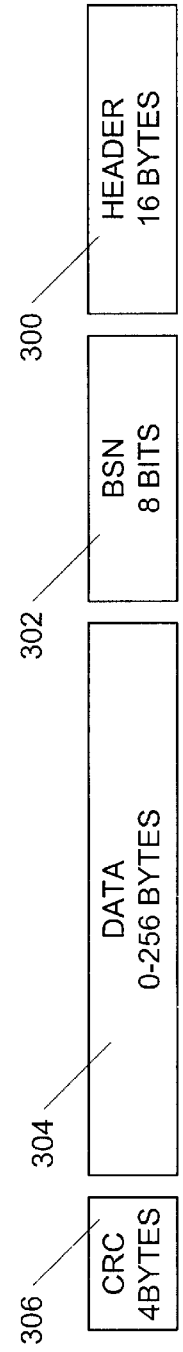
FIG. 3 is a schematic diagram of the contents of a data cell.

FIG. 3 illustrates, in a schematic form, the contents of a data cell which might be used with the aforementioned NGIO switched bus system. Such a data cell arrangement is exemplary only and other data cell arrangements can be used within the spirit and scope of the invention. Preferably, the BSN is inserted into the data cell as illustrated in FIG. 3, however, the BSN could also be placed between data cells.

The data cell illustrated in FIG. 3 consists of a header 300 which illustratively has 16 bytes and indicates the type of data cell and other data cell information. Next, the data cell includes a bundle sequence number 302 which illustratively consists of eight bits. The next portion of the data cell is the data payload portion 304 which consists of 0–256 bytes. Finally, the data cell includes a cyclical redundancy code (CRC) 306 which is used for error detection and correction. The CRC is normally calculated from the contents of the data cell when the cell is constructed. After the cell has been transmitted, a new CRC value is calculated and compared to the value in the data cell. A mismatch in values indicates a cell error or corrupted data and, in some cases, can be used to correct certain errors.

In a preferred embodiment, such as that illustrated in FIG. 3, even though it is included in the data cell, the bundle sequence number 302 is not included in the computation of the cyclical redundancy code 306. Consequently, if the BSN must be regenerated during an intermediate point in the transmission, the CRC code does not have to be recalculated at the intermediate point. Since it is not included in the CRC calculation, the BSN is protected by its own error protecting code. For example, an eight-bit BSN might consist of six sequence number bits and two error detecting bits. In a simple illustrative scheme one of the two bits might be used to indicate the parity of the even bits of the sequence number and the other error detecting bit might be coded with the parity of the odd sequence number bits.

Figure 4:
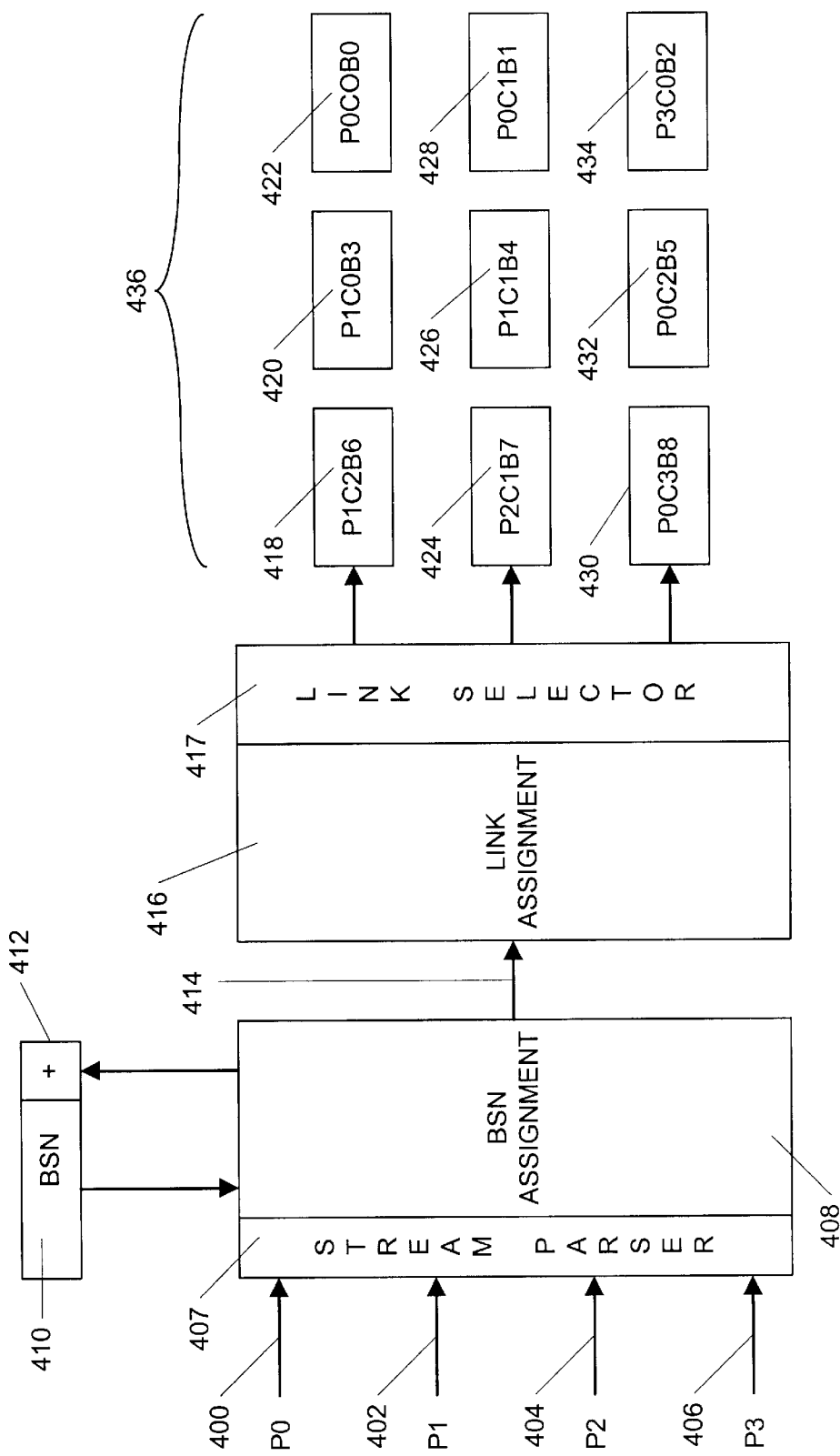
FIG. 4 is block diagram of a data sender including mechanisms for inserting bundle sequence numbers in the data cells and for assigning data cells to links in a bundle.

Bundle sequence numbers are assigned at the data sender by means of an apparatus such as that illustrated in FIG. 4. The main portions of the apparatus include a stream parser 407, a bundle sequence number assignment mechanism 408, a link assignment mechanism 416 and a link selector 417. The bundle sequence number assignment mechanism 408 receives data packets that have been broken into data cells by the stream parser 407 and assigns bundle sequence numbers to the data cells within the packets. As each data cell is assigned a bundle sequence number, the number is incremented and the incremented number is assigned to the next data cell. During the BSN assignment process, cells from different data packets can be intermixed as long as the cell order within the data packet is maintained.

In particular, as shown in FIG. 4, four different data packet streams are provided to the stream parser mechanism 407. These include data packet streams P0–P3, denoted as 400–406 respectively. The stream parser 407 divides the data packet streams into groups of data cells. Data cell groups may have a single cell or more than one cell in them. Cell groups preferably are taken in a round robin fashion from data packet streams 400–406 or may be taken in some other manner. BSN assignment mechanism 408 inserts into, or otherwise associates BSN numbers with, the data cell groups taken from each of the data packet streams 400–406. In particular, mechanism 408 increments the BSN 410 by means of a mechanism 412 and associates the number into the next cell group to be processed. In any case, a data cell of a particular data packet stream which sequentially follows a first data cell must receive a BSN which has a higher value than the BSN which is assigned to the first data cell.

Since a fixed number of bits are used for the BSN, at some point the BSN will reach its maximum number and then BSNs will repeat or "roll-over." As discussed below, cells which are lost during transmission cause the corresponding BSN to be skipped. If enough cells are lost, a rolled-over value of the BSN might be mistaken for the next BSN value, a problem called "aliasing." For example, if the maximum BSN value is 64, there are eight links, and cells are assigned in groups with a single cell in each group in round robin fashion as discussed above, the first link would get receive a cell with a BSN every eight cells, as follows:

| Cells | C1 | C2 | C3 | C4 | C5 | C6 | C7 | C8 | C9 | C10 | ... |
|---|---|---|---|---|---|---|---|---|---|---|---|
| BSN | 0 | 8 | 16 | 24 | 32 | 40 | 48 | 56 | 0 | 8 | ... |

When cell C1 is received, the data receiver will next expect to receive a data cell from the first link with a BSN of 8. However, if cells C2 to C9 are lost, then, when cell C10 arrives, it will have a BSN of 8 and may be mistaken for the correct cell C2. In this case the BSN of cell C10 aliases to the BSN of cell C2

In accordance with a preferred embodiment of the invention, in order to reduce the possibility of aliasing of sequence numbers due to lost cells, the maximum sequence number is selected to be a prime number. Thus the BSN will count to this prime number before rolling over.

For example, using all bits of a 6 bit value BSN value discussed above allows a maximum count of 64 cells (0 to 63). The largest prime number less than 64 is 61, so the sequence number should go from 0 to 60. In the eight link example above, this gives a BSN sequence such as:

0,8,16,24,32,40,56,3,11,19,27,35,43,51,59,6 etc.

By using a rollover value of 60, a much larger number of cells must become lost before aliasing occurs because in order for aliasing to occur at least 61 cells must be lost, for any number of links. Its assumed that multi-cell errors that would cause lost cells across links, that would cause an alias problem, would also force a link error.

After the assignment mechanism 408 inserts a BSN into each data cell group, the cell groups are sent, via path 414, to a link assignment mechanism 416. Link assignment mechanism 416 sequentially transmits a data cell groups to one of the data links 438, 440, and 442 selected by link selector 417. Although only three data links are shown, the invention can operate with less or more data links. As previously mentioned, links are selected in a round robin fashion. Thus, groups of cells are transmitted in a round robin fashion over the links in a bundle. This results in a stream of data cells 436 for each of the three data links 438–442. In accordance with the round robin scheduling arrangement, sequential data cells from each data packet stream are assigned in order to one of the links. This assignment results in data packet streams as indicated in FIG. 4. For example, cell 0 of packet 0 is assigned BSN 0 as indicated in data cell 422. This cell is assigned to link 438. The next sequential data cell C1 of packet 0 is assigned BSN 1 resulting in data cell 428, which is assigned to the next ordered link 440.

Since data packets can be intermixed, the next sequential cell to be assigned a BSN might be cell 0 of packet 3 resulting in cell 434 which is assigned to the next ordered link 442. The next data cell to be assigned will now be assigned to link 438 and in the arrangement shown in FIG. 4 is cell 0 of packet 1 and is assigned BSN 3 resulting in data cell 420 which is assigned to link 428. In this manner, the remaining data cells 426, 432, 418, 424 and 434 are assigned in sequential fashion to data links 438–442.

Figure 5:
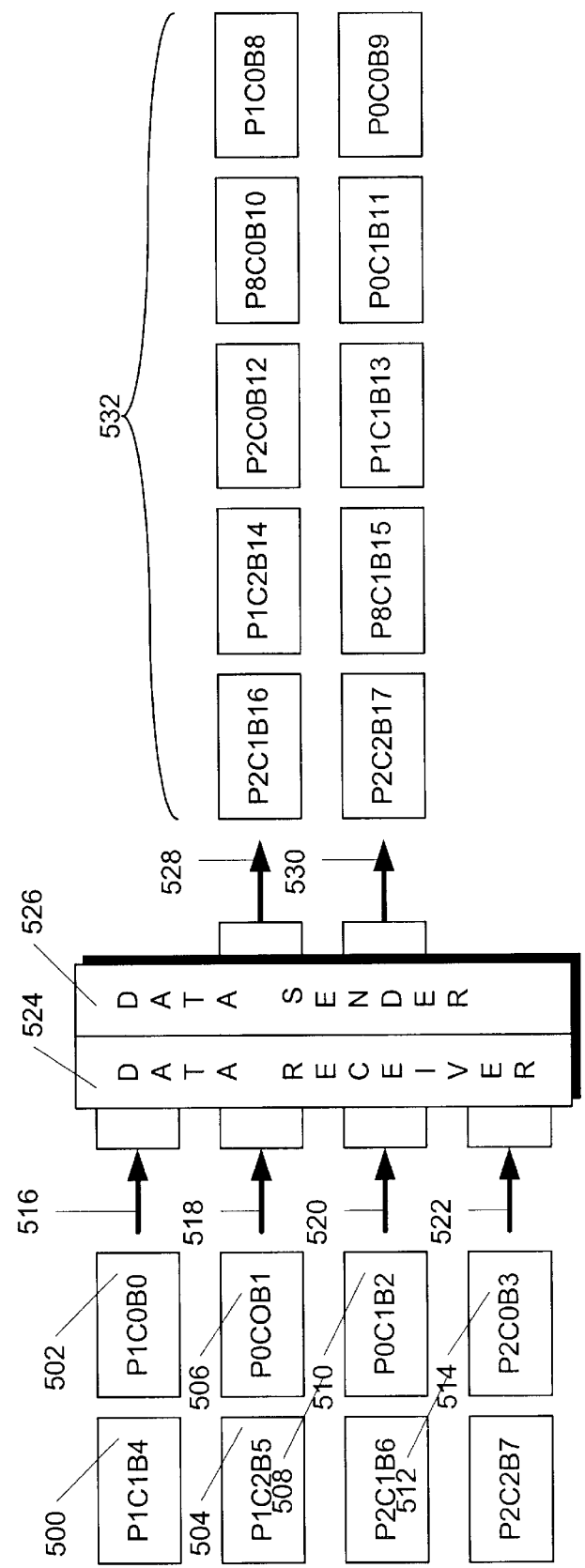
FIG. 5 is a schematic diagram of an intermediate point in the switched configuration illustrating the regeneration of bundle sequence numbers.

The bundle sequence numbers are used only on a single hop or link. At the start of each new hop, the bundle sequence numbers are regenerated. The regeneration of bundle sequence numbers is illustrated in FIG. 5. Four data links, 516, 518, 520 and 522, enter a data receiver 524. Each of the data links carries a data stream comprised of cells with bundle sequence numbers. For clarity, in each stream, two data cells are illustrated, but additional cells would normally be present. As these streams were assigned by the round robin link assignment mechanism 416 illustrated in FIG. 4, the bundle sequence numbers are sequential from link to link, that is BSN B0 arrives in cell 502, BSN B1 arrives in cell 506, BSN B2 in cell 510 and BSN B3 in cell 514. In accordance with the round robin assignment scheme, data cells are further assigned starting again with link 516 such that BSNs B4, B5, B6 and B7 arrive in cells 500, 504, 508, and 512, respectively. These bundle sequence numbers are discarded at the data receiver 524.

However, at the data sender side of the transfer point 526, the BSNs are regenerated as the cells are assigned to links 528 and 530 in the outgoing bundle. This results in a sequence of cells 532 on each of the links 528 and 530. New bundle sequence numbers are assigned as illustrated ranging from B8–B17. Bundle sequence numbers on the four link input bundle 516–522 bear no relationship to the bundle sequence numbers on the two link output bundle 528–530 with the exception that correct cell order is maintained.

Figure 6:
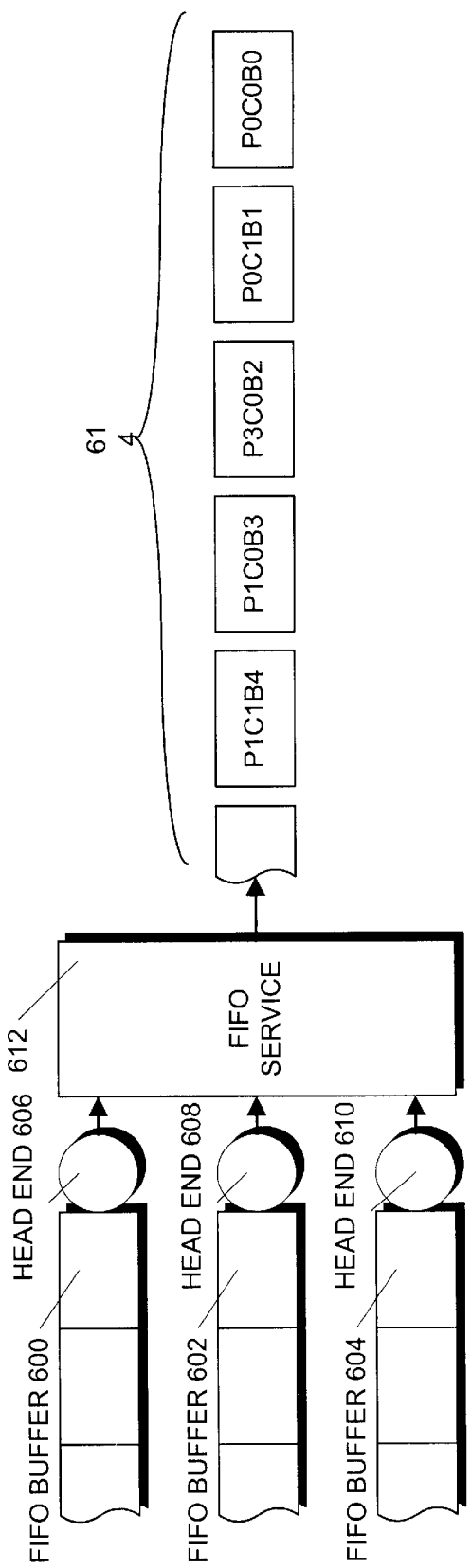
FIG. 6 is a schematic diagram illustrating processing of the data cells at a data receiver.

FIG. 6 illustrates processing of the data link bundle at the data receiving end. In particular, data cells arriving on each of the data links in the bundle are provided to first in and first out (FIFO) buffers. FIG. 6 illustrates a data receiver having three input data links which are provided to FIFO buffers 600, 602 and 604. Each of buffers 600, 602, and 604 has a "head-end" 606, 608, 610, respectively at which a data cell to be processed appears. FIFO buffers 600–604 are used to correct for time "skewing" of data cells. Time skewing can arise due to different transit times of the links, differing cell sizes, link jitter and other well-known causes.

The FIFO service mechanism 612 examines the head-end 606–610 of each of the FIFO buffers 600–604 in the prearranged link order. The next cell with the next corresponding BSN which the receiver expects to process should be located at the head end of the FIFO buffer associated with this link. If the expected cell with the expected BSN is not present at this FIFO, an error condition is indicated and is handled in a manner discussed in detail below. If the expected cell with the expected BSN is at the head-end of the next FIFO, the cell is removed and forwarded to the data receiver. The FIFO associated with the next link in the prearranged order is then examined.

The output of the FIFO service mechanism 612 is a stream of data cells 614 in which the cells have been rearranged into the correct order as indicated in FIG. 6. During the processing of the FIFO buffers, each FIFO buffers is serviced as long as it is not empty. However, an empty FIFO buffer is not skipped over but examined in the context of the other FIFO buffers. Certain errors can cause FIFO buffers to become empty while there are still cells in other FIFOs that need servicing, as explained below in detail.

Error conditions can manifest themselves in a number of ways. For example, a cell might be received at the proper time, but the cell may be damaged. In particular, the cell may have proper cell framing, but the CRC code indicates an error or the cell body has coding errors. A cell can also be recognized as lost if its associated framing is also lost. Alternatively, an entire link could become inoperative. The receive algorithm operating in the FIFO service mechanism 612 must be designed to be tolerant of these errors. Since the bundle sequence number is itself error protected, errors in the bundle sequence number can be detected and treated as damaged cells.

Damaged cells are handled by flagging the cell as in error and removing it from its respective FIFO buffer. The FIFO buffer associated with the next data link in the prearranged sequence is then examined. If the next cell to be processed in this latter FIFO buffer has a bundle sequence number with a value of one higher than the bundle sequence number of the damaged cell, then the system is considered in synchronism and operation continues in the normal manner. If a number of cells are damaged, they are processed in the similar manner. In particular, the cells are removed from their respective FIFO buffers and marked as in error. The expected bundle sequence number is then incremented. Cells are examined until a undamaged cell is found. Alternatively, a maximum number of damaged cells can be predetermined. When the number of damaged cells reaches the maximum, a resynchronization process can be initiated as described below.

A cell is considered as lost if the proper cell framing is not detected. Lost cells, or course, are not entered into the receiver FIFO buffers. However, lost cells can reappear as a unexpected bundle sequence number in an FIFO buffer along with a good cell. If the receiver processing mechanism detects a unexpected BSN, it responds by checking the next FIFO buffer in the link sequence for a BSN which has been incremented by one over the detected unexpected BSN. If the incremented BSN is detected, the receiver continues from that point. However, if the next FIFO does not have the incremented BSN, then the receiver initiates the resynchronization procedure discussed below. In particular, if the BSN of the cell in the next FIFO equals the expected BSN plus the bundle size, this is a good indication that a cell has been lost.

If a link in a bundle fails, no cells will be received in the corresponding FIFO buffer. In this case, current cells in the other link FIFO buffers are removed and the failed link is treated as having all skipped cells. The bundle must be then reconfigured by conventional link management routines to remove the failed link.

In certain situations, a lost data cell can cause the FIFO buffer for the next link to become empty even though other cells remain to be processed. A time-out mechanism can be used to detect when the next FIFO buffer is empty while other FIFO buffers are not empty.

Figure 7A:
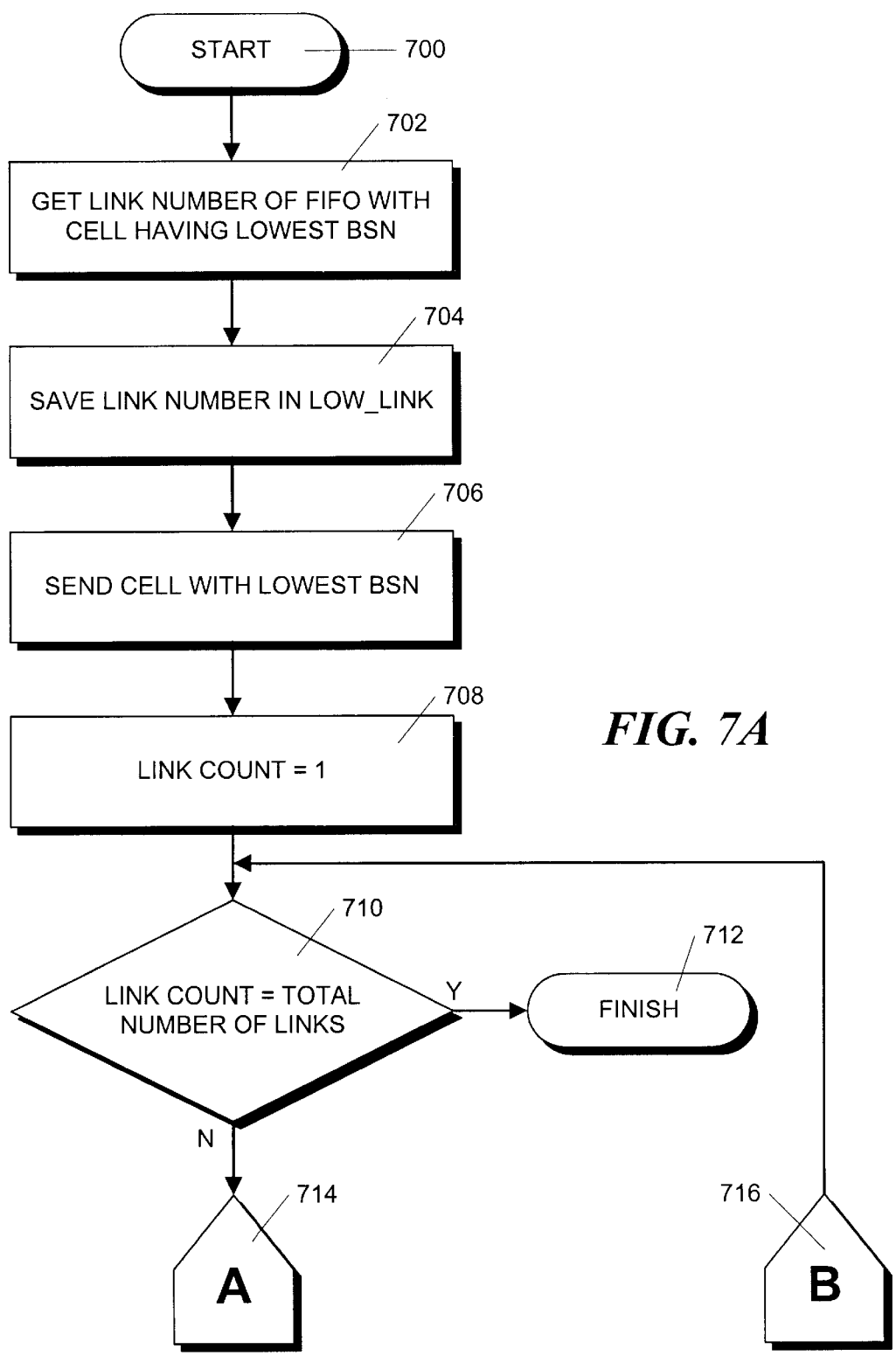
FIGS. 7A and 7B, when placed together, form a flowchart illustrating the steps in an illustrative process for re-synchronizing data cell processing to incoming data cell streams.
Figure 7B:
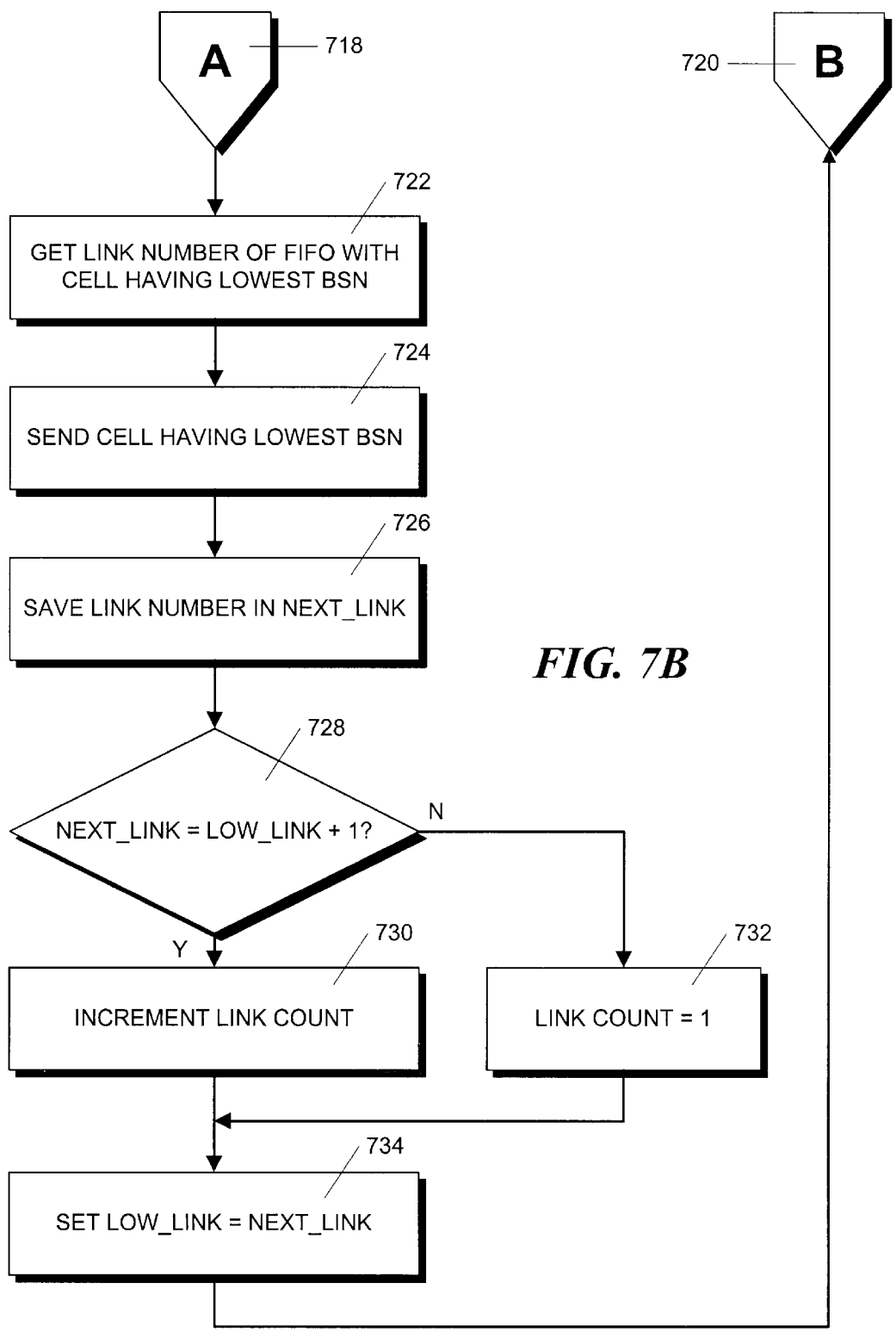

A cell synchronization process illustrated in detail in FIGS. 7A and 7B is entered when more than a simple cell skip is detected. As previously mentioned, this condition is detected when the BSN of a processed cell does not match its expected value and the BSN of the next cell to be processed does not match the expected value of the BSN for the previous cell incremented by one.

The process starts in step 700 and proceeds to step 702 where a routine which searches over the data links in a bundle is used to obtain the link number of the FIFO with a to-be-processed cell having the lowest BSN. The search performed by this routine can be performed by conventional search methods using either a parallel scan process or a serial scan process.

Next, in step 704, the link number detected in the search is saved in a variable called low_link. In step 706, the cell with the lowest BSN is removed from the FIFO and forwarded to the data receiver. Next, in step 708, a link count variable is set equal to one.

In step 710, the value in the link count variable is compared with the total number of links. If the link count value equals the total number of links, then the routine finishes in step 712. Alternatively, if in step 710, the link count value is less than the total number of links, the routine proceeds, via off-page connectors 714 and 718, to step 722.

In step 722, the link number of the FIFO buffer with a new cell having the lowest BSN is obtained using a search routine similar to that used in step 702. Next, in step 724, the cell having the lowest BSN is forwarded to the data receiver. In step 726, the link number obtained in step 722 is stored in a variable called next_link.

In step 728, a comparison is made between the value stored in the variable next_link and the value stored in the variable low_link incremented by one. If these values are equal, the link counter is incremented in step 730. Alternatively, if the value stored in the next_link variable does not equal the value stored in the variable low_link incremented by one, then, in step 732, the link count is set equal to one.

In either case, the routine proceeds to step 734 where the value of the low_link variable is set equal to the value of the next_link variable. The routine then proceeds, via off-page connectors 720 and 716, back to step 710 in which the link count variable is compared to the total number of links. Operation continues in this manner until proper bundle sequence numbers have been detected for all links. The routine then finishes in step 712.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. Apparatus for bundling a plurality of serial data transmission links to obtain increased data throughput for a plurality of interleaved streams of data cells, the apparatus comprising:
   a stream parser mechanism for dividing each stream of data cells into a plurality of data cell groups;
   a sequence number mechanism for associating a bundle sequence number with each of the data cell groups, the bundle sequence number being used to reconstruct each of the streams of data cells in a correct order;
   a link selector for selecting one of the plurality of serial data transmission links in a fixed repeating order; and
   a cell assignment mechanism for transmitting one of the data cell groups, including the associated bundle sequence number, over the selected one of the serial data transmission links.

2. The apparatus according to claim 1 wherein the bundle sequence number increases with each of the data cell groups.

3. The apparatus according to claim 2 wherein the bundle sequence number repeats after reaching a predetermined maximum number.

4. The apparatus according to claim 3 wherein the predetermined maximum number is a prime number.

5. The apparatus according to claim 1 wherein the bundle sequence number is inserted into one data cell in the associated data cell group.

6. The apparatus according to claim 1 wherein data in each data cell in the stream of data cells is used to compute an error correcting code which is inserted into the each data cell and wherein the bundle sequence number is not included in the computation of the error correcting code.

7. The apparatus according to claim 6 wherein the bundle sequence number is error protected.

8. The apparatus according to claim 1 wherein the fixed repeating order is a round robin order.

9. The apparatus according to claim 1 wherein the stream of data cells comprises a plurality of data packet cell streams and wherein the stream parser divides each data packet cell stream into one of the data cell groups.

10. The apparatus according to claim 9 wherein each of the data cell groups comprises a single data cell.

11. Apparatus for unbundling a plurality of data cell streams received over a plurality of serial data transmission links wherein data cells in the data cell streams are transmitted in data cell groups together with a bundle sequence number associated with each data cell group over the data transmission links in a predetermined fixed order, the apparatus comprising:
    a plurality of buffers, each buffer receiving data cells from one of the data cell streams;
    a buffer service mechanism which examines each of the plurality of buffers in the predetermined fixed order and removes a data cell group from each of the buffers when the bundle sequence number associated with that data cell group matches an expected value; and
    a concatentator which forms the data cell groups removed from each of the buffers into a data stream.

12. The apparatus according to claim 11 wherein the expected value equals the bundle sequence number from a preceding data cell group incremented by a predetermined amount.

13. The apparatus according to claim 12 wherein the expected value repeats after reaching a predetermined maximum number.

14. The apparatus according to claim 13 wherein the predetermined maximum number is a prime number.

15. A method for bundling a plurality of serial data transmission links to obtain increased data throughput for a plurality of interleaved streams of data cells, the method comprising the steps of:
    (a) dividing the streams of data cells into a plurality of data cell groups;
    (b) associating a bundle sequence number with each of the data cell groups, each bundle sequence number being used to reconstruct the stream of data cells in a correct order;
    (c) selecting one of the plurality of serial data transmission links in a fixed repeating order; and
    (d) transmitting each of the cell groups, including the associated bundle sequence number over the selected one of the serial data transmission links.

16. The method according to claim 15 wherein the bundle sequence number increases with each of the data cell groups.

17. The method according to claim 16 wherein the bundle sequence number repeats after reaching a predetermined maximum number.

18. The method according to claim 17 wherein the predetermined maximum number is a prime number.

19. The method according to claim 15 wherein step (d) comprises the step of:

(d1) inserting the bundle sequence number into one data cell in the associated data cell group.

20. The method according to claim 15 wherein step (a) comprises the steps of:
(a1) computing an error correcting code from data in each data cell in the stream of data cells excluding the bundle sequence number; and
(a2) inserting the error correcting code into the each data cell.

21. The method according to claim 20 wherein step (d) comprises the step of:
(d1) error protecting the bundle sequence number.

22. The method according to claim 15 wherein the fixed repeating order is a round robin order.

23. The method according to claim 15 wherein the stream of data cells comprises a plurality of data packet cell streams and wherein step (a) comprises the step of:
(a1) dividing each data packet cell stream into one of the data cell groups.

24. The method according to claim 23 wherein each of data cell groups comprises a single data cell.

25. A method for unbundling a plurality of data cell streams received over a plurality of serial data transmission links wherein data cells in the data cell streams are transmitted in data cell groups together with a bundle sequence number associated with each data cell group over the data transmission links in a predetermined fixed order, the method comprising the steps of:
(a); receiving data cells from one of the data cell streams in a one buffer selected from a plurality of buffers;
(b) examining each of the plurality of buffers in the predetermined fixed order and removing a data cell group from each of the buffers when the bundle sequence number associated with that data cell group matches an expected value; and
(c) forming the data cell groups removed from each of the buffers into a data stream.

26. The method according to claim 25 wherein the expected value equals the bundle sequence number from a preceding data cell group incremented by a predetermined amount.

27. The method according to claim 26 wherein the expected value repeats after reaching a predetermined maximum number.

28. The method according to claim 27 wherein the predetermined maximum number is a prime number.

29. A computer program product for bundling a plurality of serial data transmission links to obtain increased data throughput for a plurality of interleaved streams of data cells, the computer program product comprising a computer usable medium having computer readable program embodied thereon, including:
program code for dividing the streams of data cells into a plurality of data cell groups;
program code for associating a bundle sequence number with each of the data cell groups, each bundle sequence number being used to reconstruct the stream of data cells in correct order;
program code for selecting one of the plurality of serial data transmission links in a fixed repeating order; and
program code for transmitting each of the cell groups, including the associated bundle sequence number over the selected one of the serial data transmission links.

30. A computer program product for unbundling a plurality of data cell streams received over a plurality of serial data transmission links wherein data cells in the data cell streams are transmitted in data cell groups together with a bundle sequence number associated with each data cell group over the data transmission links in a predetermined fixed order, the computer program product comprising a computer usable medium having computer readable program code embodied thereon, including:
program code for receiving data cells from one of the data cell streams in one buffer selected from a plurality of buffers;
program code for examining each of the plurality of buffers in the predetermined fixed order and removing a data cell group from each of the buffers when the bundle sequence number associated with that data cell group matches an expected value; and
program code for forming the data cell groups removed from each of the buffers into a data stream.

* * * * *